US010697879B2

(12) United States Patent
Blackford et al.

(10) Patent No.: US 10,697,879 B2
(45) Date of Patent: *Jun. 30, 2020

(54) COLLOID SIZE DISTRIBUTION MEASUREMENT TECHNOLOGY

(71) Applicant: Fluid Measurement Technologies, Inc., White Bear Lake, MN (US)

(72) Inventors: David Blackford, White Bear Lake, MN (US); Derek Oberreit, Roseville, MN (US); Donald C. Grant, Grand Marais, MN (US); Gary Van Schooneveld, Eden Prairie, MN (US); Mark R. Litchy, Plymouth, MN (US)

(73) Assignee: Fluid Management Technologies, Inc., White Bear Lake, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/945,783

(22) Filed: Apr. 5, 2018

(65) Prior Publication Data

US 2018/0224366 A1    Aug. 9, 2018

Related U.S. Application Data

(62) Division of application No. 14/665,605, filed on Mar. 23, 2015, now Pat. No. 9,958,371.

(Continued)

(51) Int. Cl.
*G01N 15/02* (2006.01)
*G01N 15/06* (2006.01)
*G01N 15/00* (2006.01)

(52) U.S. Cl.
CPC ..... *G01N 15/0211* (2013.01); *G01N 15/0255* (2013.01); *G01N 15/065* (2013.01);

(Continued)

(58) Field of Classification Search
CPC .......... G01N 15/0211; G01N 15/0255; G01N 15/065; G01N 2015/0053; G01N 2015/0088; G01N 2015/0261

(Continued)

(56) References Cited

U.S. PATENT DOCUMENTS 5,374,396 A * 12/1994 Blackford .............. G01N 15/06
137/896
6,498,641 B1 * 12/2002 Schildmeyer ........ G01N 15/065
356/335

(Continued)

OTHER PUBLICATIONS

National Academies Publication—Jan. 2005—Sensor Systems for Biological Agent Attacks: Protecting Buildings and Military Bases.

*Primary Examiner* — Marrit Eyassu
(74) *Attorney, Agent, or Firm* — Skinner and Associates; Joel D. Skinner, Jr.

(57) ABSTRACT

A method and system of measuring the size distribution of particles within dilute colloids, for example, through variation of the minimum detected size of aerosolized colloid particles. The method of determining the size distribution of particles in a fluid, involves forming a stream of aerosol droplets of the fluid, the droplets containing particles and dissolved material evaporating the droplets to generate particles, and measuring the concentration of particles by varying a detection threshold. A system or apparatus for determining the size distribution of particles in a fluid, includes a droplet former for forming a stream, of aerosol droplets of the fluid, the droplets containing particles and dissolved material, and a condensation particle detector for evaporating the droplets to generate particles and for measuring the concentration of particles, the condensation particle detector having a variable detection threshold.

28 Claims, 8 Drawing Sheets

Related U.S. Application Data

(60) Provisional application No. 61/969,478, filed on Mar. 24, 2014.

(52) U.S. Cl.
CPC .............. *G01N 2015/0053* (2013.01); *G01N 2015/0088* (2013.01); *G01N 2015/0261* (2013.01)

(58) Field of Classification Search
USPC ........................................................ 73/61.71
See application file for complete search history.

(56) References Cited

U.S. PATENT DOCUMENTS

| | | | | |
|---|---|---|---|---|
| 2007/0242261 A1* | 10/2007 | Liu | G01N 1/2252 | 356/37 |
| 2008/0137065 A1* | 6/2008 | Oberreit | G01N 30/84 | 356/37 |
| 2008/0144003 A1* | 6/2008 | Blackford | G01F 1/661 | 356/37 |
| 2009/0031786 A1* | 2/2009 | Takeuchi | G01N 15/065 | 73/28.04 |
| 2009/0078062 A1* | 3/2009 | Maheshwari | G01N 1/2208 | 73/863.22 |
| 2009/0183554 A1* | 7/2009 | Grant | G01N 1/4022 | 73/61.71 |
| 2010/0031734 A1* | 2/2010 | Zhang | G01N 33/18 | 73/61.43 |

\* cited by examiner

FIG. 6

- 71 IMPACTOR PIN
- 72 SPRING
- 73 ADJUSTMENT SCREW
- 70

FIG. 7 PRIOR ART

- 80
- 82 Saturator
- 83 Condenser
- Aerosol →
- 81 Saturator | Condenser

FIG. 8

- 90
- Condenser
- Aerosol →
- Saturator | Saturator
- Condenser

__US 10,697,879 B2__

COLLOID SIZE DISTRIBUTION MEASUREMENT TECHNOLOGY

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, hut otherwise reserves all copyright rights whatsoever.

CROSS REFERENCE TO RELATED APPLICATIONS, IF ANY

This application claims the benefit under 35 U.S.C. § 119(e) of U.S. Provisional Patent Application Ser. No. 61/969,478, filed Mar. 24, 2014, and Ser. No. 62/074,931, filed Nov. 4, 2014 which are hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

Field of the Invention

The present invention relates, generally, to methods and apparatus for analyzing material. Particularly, the invention relates to methods and apparatus for measuring the size distribution of particles in dilate colloids. Most particularly, the invention relates to methods and apparatus for measuring the size distribution of particles within the dilute colloid through variation of the minimum, detected size of aerosolized colloid particles. The technology is useful, for example, for colloid characterization, filter testing, and high purity water system monitoring.

Background Information

Existing technology in this field is believed to have significant limitations and shortcomings. Specifically, systems used to measure particle size distributions in colloids are limited to particle diameters greater than 25 nm, when such colloids are present at very low concentrations in ultrapure liquids.

Small particles are a major problem for the semiconductor device manufacturing industry. Particles smaller than 50 nm can significantly reduce manufacturing yield of present day semiconductor devices. The ability to measure concentrations, especially low concentrations, of these particles is highly desired. A brief summary of the state of the art is provided in U.S. Pat. Nos. 8,272,253 and 8,573,034.

All US patents and patent applications, and all other published documents mentioned anywhere in this application are incorporated by reference in their entirety.

BRIEF SUMMARY OF THE INVENTION

The present invention provides analysis methods and apparatus which are practical, reliable, accurate and efficient, and which are believed to constitute an improvement over the background technology. In the preferred embodiment, the invention relates to an aerosolization apparatus and method which creates line droplets of the fluid (nebulization) containing particles and dissolved material at concentrations equal to the bulk material Upon evaporation of the liquid, the gas-borne droplet becomes either a particle consisting of non-volatile dissolved material or a particle consisting of a colloid particle and non-volatile dissolved material. At the residue concentrations and particle sizes of interest, these aerosol particles are too small to be detected optically. The particles are then sampled by a condensation particle counter (CPC) with a temporally or spatially varying detection threshold diameter. In the preferred embodiment, the sample introduced to the nebulizer may consist of the unaltered source colloid, a colloid downstream of a sample introduction device, or downstream of a colloid concentrator (employing evaporation and/or cross flow filtration).

The basic method of the invention for determining the size distribution of particles in a fluid, involves forming a stream of aerosol droplets of the fluid, the droplets containing particles and dissolved material, evaporating the droplets to generate particles, and measuring the concentration of particles by varying a detection threshold. The basic system or apparatus for determining the size distribution of particles in a fluid, includes a droplet former for forming a stream of aerosol droplets of the fluid, the droplets containing particles and dissolved material, and a condensation particle detector for evaporating the droplets to generate particles and for measuring the concentration of particles, the condensation particle detector having a variable detection threshold.

In one aspect, the invention relates to a condensation particle counter where the degree of supersaturation is temporally varied by adjusting the temperatures, of the saturated, aerosol stream and/or the walls of the transport cavities on the condensing region. These temperatures may either be adjusted in a stepwise manner or continuously ramped.

In another aspect, the invention relates to a condensation particle counter where the degree of supersaturation is temporally varied by adjusting the ratio of a vapor saturated flow to a dry flow.

In another aspect, the indention relates to a condensation particle counter where the degree of supersaturation is temporally varied by adjusting the vapor content by controlling the mass of vapor delivered to the gas either by adding a controlled amount of liquid to the gas stream or by controlling the exposure of the gas stream to the working fluid surface.

In another aspect, the invention relates to a condensation particle counter where the degree of supersaturation is spatially varied where particles are exposed to an increasing degree of supersaturation. Larger particles (where the onset of condensational growth occurs at a lower supersaturation) have a longer growth period and thus the resulting droplets are larger. By measuring the amount of light scattered by these droplets (larger droplets lead to more scattered light), the size of the original particle can be inferred.

The present invention is believed to involve novel elements, combined in novel ways to yield more than predictable results. The problems solved by the invention were not fully recognized in fee prior art.

The aspects, features, advantages, benefits and objects of the invention will become clear to those skilled in the art by reference to the following description, drawings and claims.

BRIEF DESCRIPTION OF THE SEVERAL VIEWS OF THE DRAWING

FIG. 6 illustrates an embodiment of the movable impactor pin.

FIG. 7 is a block diagram showing a conventional condensation particle counter (CPC).

FIG. 8 is a block diagram showing an embodiment of the CPC which utilizes a clean sheathed saturator flow.

One unique feature of the nebulizer of this invention is the recessed location of the nebulization region which allows for large droplets (where the residue after evaporation may approach particle sizes of interest) to gravitation ally settle prior to entering the evaporation section.

FIGS. 7-10 show several embodiments of a variable detection limit condensation particle counter of the system of the invention. The condensation particle counters operate on the principle that in a supersaturated vapor, vapor will condense onto particles larger than a critical size. This is referred to as activation or nucleation of the particle. These activated particles then, grow by several orders of magnitude making them easily detected using optical means. The degree of supersaturation of a vapor in an aerosol is defined by the saturation ratio:

$$S = p_v/p_{sat},$$

where ($p_v$) is the ratio of vapor pressure of a gas within the aerosol and $p_{sat}$ is the vapor pressure of that same gas over a flat surface of its condensed phase.

The critical particle diameter may be calculated using the Kelvin relation:

$$d_{p,critical} = \frac{k_B T}{4\sigma v_v \ln S},$$

where $k_B$ is Boltzmann's constant, T is the temperature, $\sigma$ is the condensed phase surface tension, and $v_v$ the volume of a vapor molecule.

The Kelvin relation accounts for the surface tension work upon the addition of a vapor molecule which is non-negligible for highly curved surfaces. The Kelvin relation shows how the minimum detected particle diameter varies with the saturation ratio of the working vapor.

FIG. 7 shows a conventional condensation particle counter or detector (CPC) 80 where an aerosol 81 travels through a saturation region 82 which brings the vapor pressure of the working fluid in the aerosol equal to $p_{sat}$ prior to entering the condensation region. In the case where the thermal diffusivity of air is higher than the mass diffusivity of the working vapor, the super-saturated vapor state is created by exposing an aerosol containing the working vapor to relatively cold transport walls. Conversely, where the mass diffusivity of the vapor is higher than the thermal diffusivity of air (e.g. water), the saturated aerosol is exposed to warm wet walls. The saturation ratio for these CPCs is temporally modified by changing the saturate 82 and/or condenser 83 temperatures.

Figure 1:
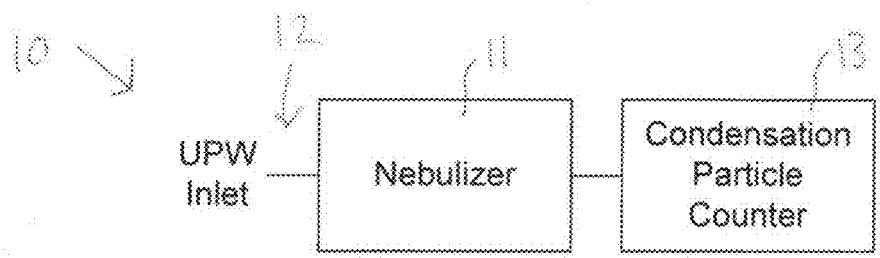
FIG. 1 is a schematic representation of a preferred embodiment of the system with no upstream colloid modification.
Figure 2:
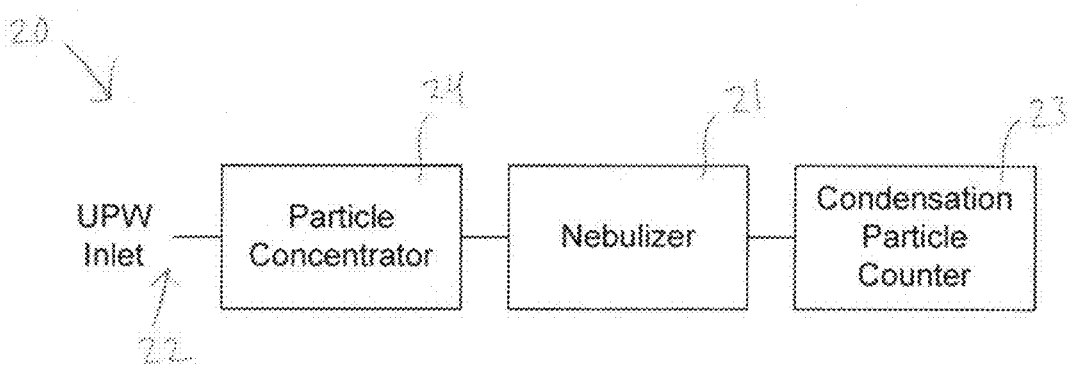
FIG. 2 is a schematic representation of an embodiment of the system employing a particle concentrator.
Figure 3:
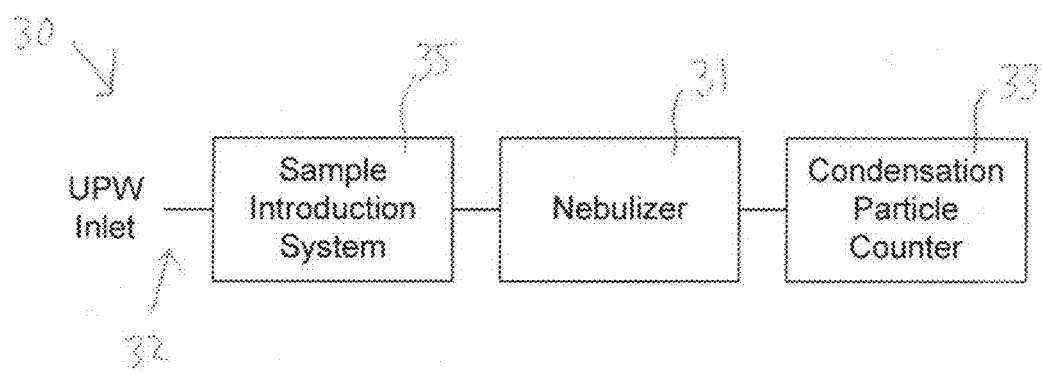
FIG. 3 is a schematic representation of an embodiment of the system employing a colloid or solute introduction device.
Figure 4:
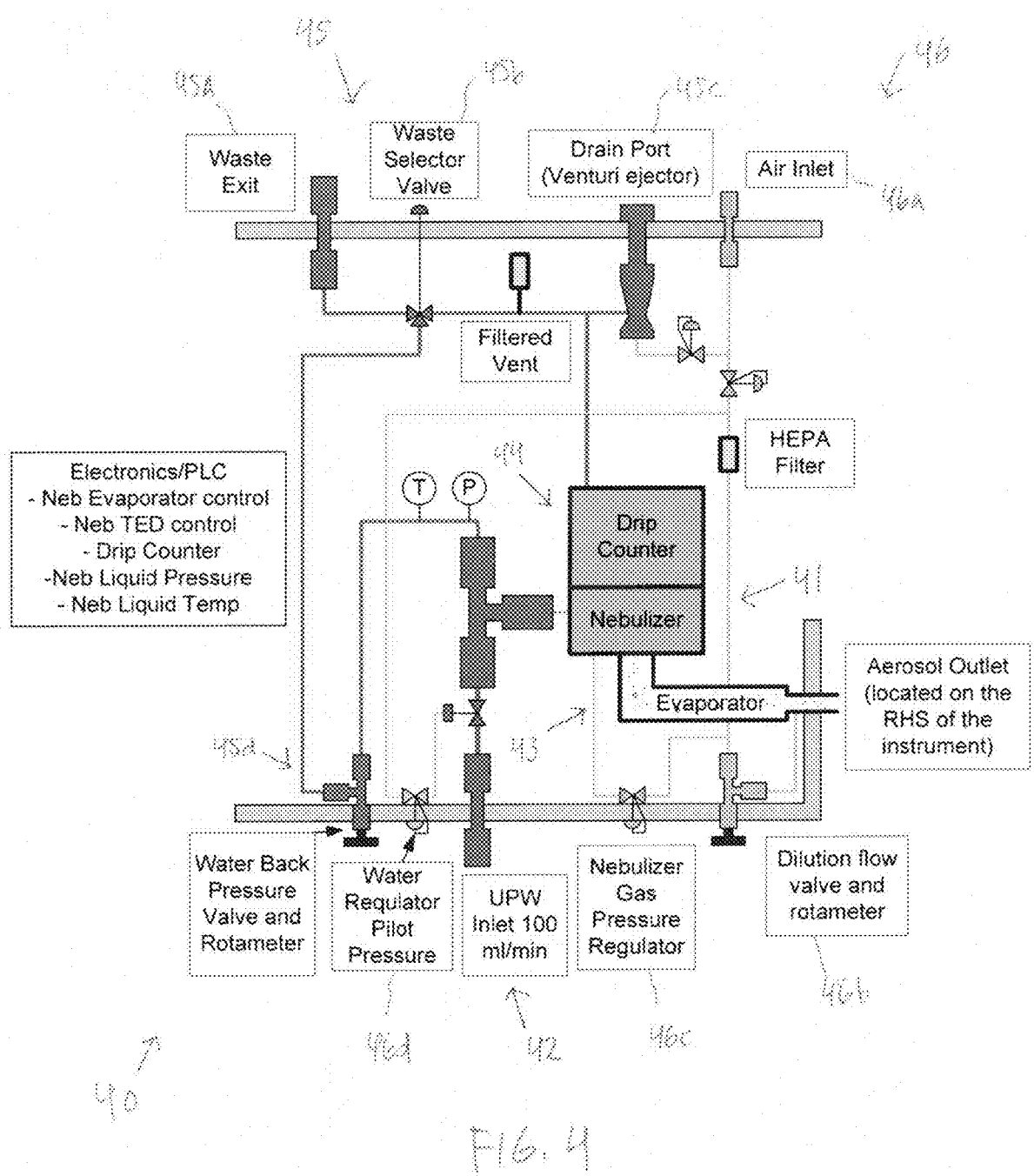
FIG. 4 is a schematic representation of a preferred embodiment of the nebulizer system of the invention.
Figure 5:
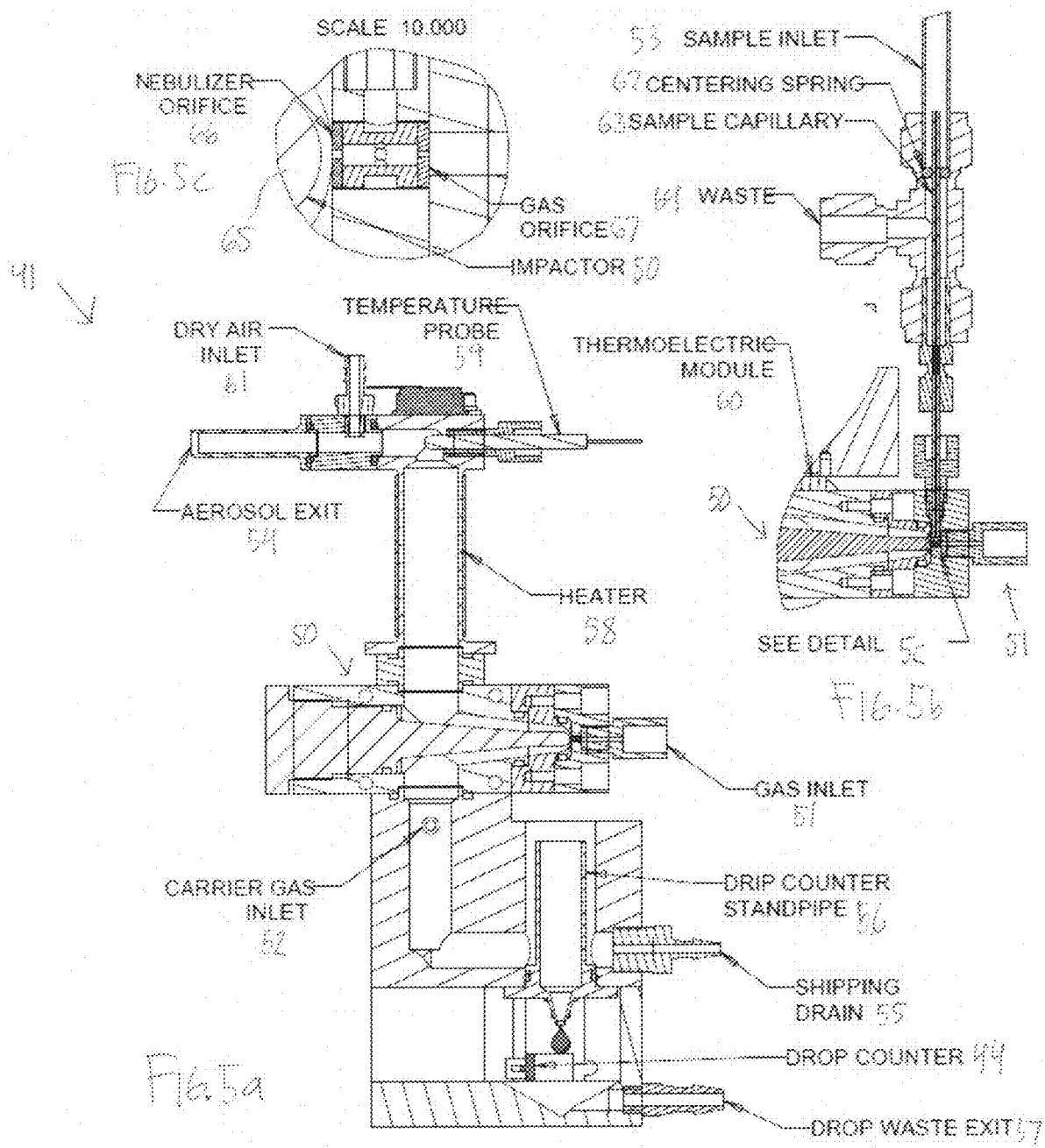
FIGS. 5a-c shows cross sectional views of the nebulizer.
Figure 9:
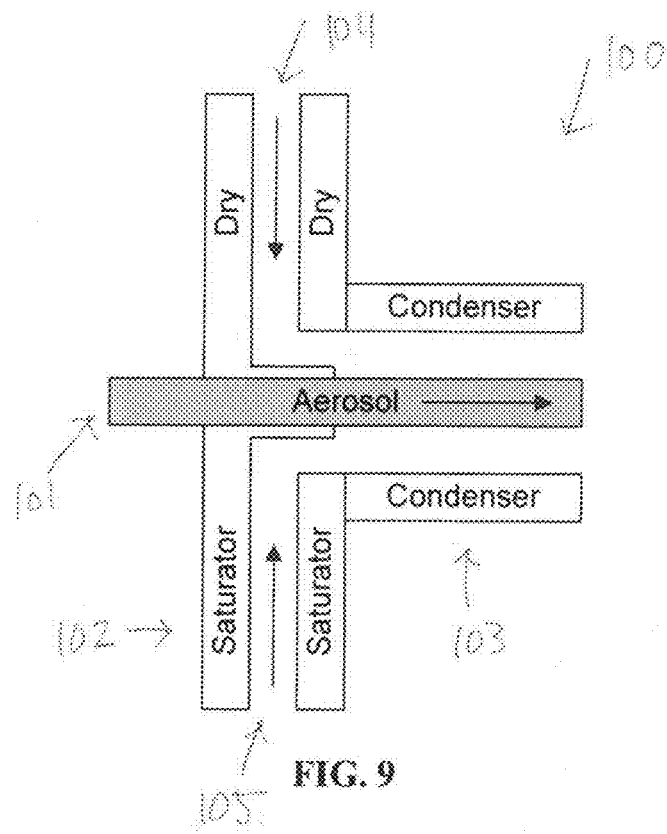
FIG. 9 is a block diagram showing an embodiment of the CPC where the degree of supersaturation is modified by a ratio of dry to vapor laden air streams.
Figure 10:
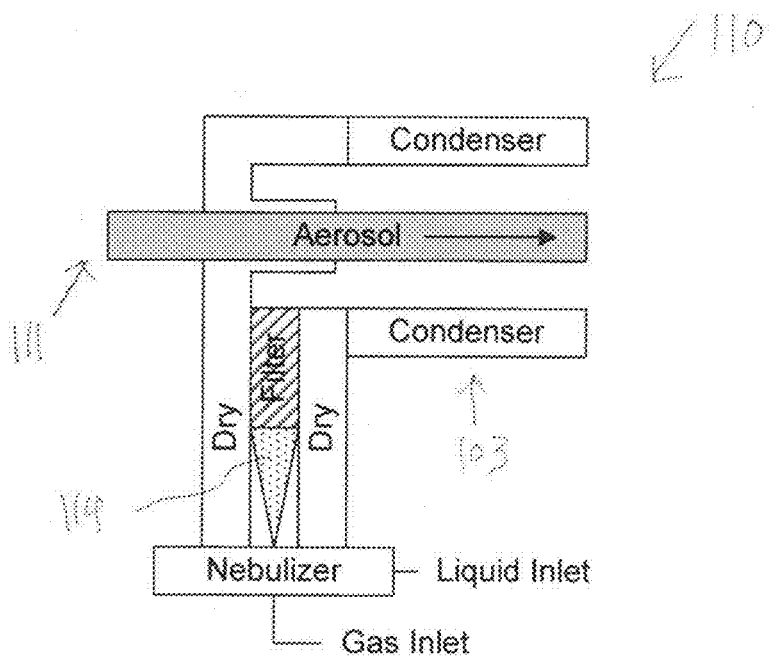
FIG. 10 is a block diagram showing an embodiment of the CPC where the degree of supersaturation is modified by controlling the mass flow of vapor.

An alternative embodiment of a CPC 90 shown in FIG. 8, and having a saturator 92 and condensor 93, sheaths the aerosol flow 91 with particle free gas 94, confining the aerosol to streamlines that experience similar levels of supersaturation resulting in a sharper size 'cutoff'. In these configurations the sheath flow may be pre-loaded with vapor prior to being introduced to the aerosol stream. For pre-loaded sheath flows, the saturation ratio may also be varied by controlling the vapor pressure of the sheath flow to a sub-saturated level. This can be accomplished by varying the ratio of dry 104 to saturated 105 air as shown in the FIG. 9 (including CPC 100 with saturation region 102 and condensor region 103, and aerosol flow 101) or by controlling the mass flow of vapor 114 introduced to the sheath gas as shown in FIG. 10 (CPC 110). In all cases the aerosol may or may not be exposed, to the working fluid directly. An additional advantage to controlling the vapor pressure of a condensing vapor is that if two condensing vapors are utilized, the temperature differential required for the onset of condensation for one of the vapors which might otherwise cause homogeneous (self activating) condensation for the second vapor can be mitigated by limiting the vapor content of the second vapor. These 'two vapor' approaches may be used when a specific working vapor is required for condensing onto very small particles (e.g. diethylene glycol) or onto particles with material dependent threshold sizes (e.g. water onto hydrophobic particles) where the initially nucleating vapor does not grow the particles to a sufficient size and the second vapor is needed to 'boost' the particles to a larger size.

For mixing type CPCs, supersaturation is achieved by mixing two gas streams of different temperatures where the hotter stream contains condensing vapor and the colder stream may or may not contain condensing vapor. If the relationship for the working fluid, dPsat/dTemp is positive, then it is possible to achieve an operating condition where the vapor content in the resulting mixture is higher than the saturated vapor content at the mixed gas temperature. The level of supersaturation can be controlled by varying the temperatures of the gas streams, the flow ratio between the gas streams, and/or explicit control of the vapor content using one of the aforementioned methods described for laminar flow CPCs. Note that mixing type CFCs require a growth section (typically cooled walls) downstream of the mixing region.

For temporally varying supersaturation levels, the size distribution of the particles in the colloid may be inferred by differentiating the measured aerosol concentration as a function of threshold diameter. For spatially varying supersaturation levels, the size distribution is inferred directly (See for example, U.S. Pat. No. 7,656,510). Temporal variation may be incremental with non-sampled periods allowing for steady state conditions, or continuous with active control and or monitoring of flows and temperatures to calculate the saturation ratio and ultimately the minimum detected particle size.

The CPC working fluid is ideally inert and non-toxic with a very low surface energy thereby limiting any material dependence tor the minimum detected particle size. Fluorinated solvents such as 3M FLUORINERT FC-40 and FC-43 have been used as working fluids but they are expensive and have deleterious environmental effects. 3M NOVEC fluids (7500) have similar properties but are cheaper and have less environmental impact. Any of the above CPCs may use these Fluorinated solvents as the working fluid (or as the primary condensing fluid in a two vapor system), much of the solvent can be recovered from the condensing region in the CPC and a downstream secondary condenser. Due to the low miscibility between the fluorinated solvents and water, the fluorinated solvent can be recycled by drawing off of the appropriate strata within the condensed fluid reservoir.

Figure 11:
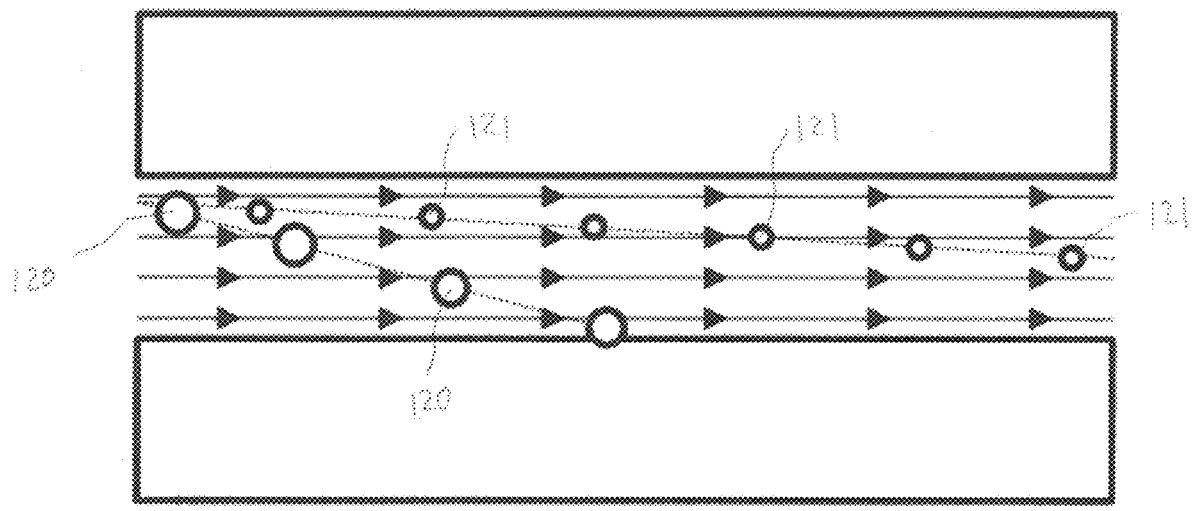
FIG. 11 is a diagram illustrating gravitational settling of large droplets.

Another embodiment of this invention utilizes an alternate large droplet removal mechanism which may be used in tandem with the existing nebulizer impactor pin described in the text Additionally, an alternate large droplet removal mechanism may be used in place of the previously described impactor pin. Specifically, the additional large droplet removal mechanisms operate by either gravitational settling or by inertial driven capture. Referring to FIG. 11, for gravitational settling, large droplets 120 will precipitate from an aerosol at a higher rate than smaller droplets 121, The terminal velocity of particles in the size range of interest can be calculated using;

$$V_{settling} = 3E-8 * \rho_p d_p^2,$$

where $\rho_p$ is in kg/m³ and $d_p$ is in μm

Figure 12:
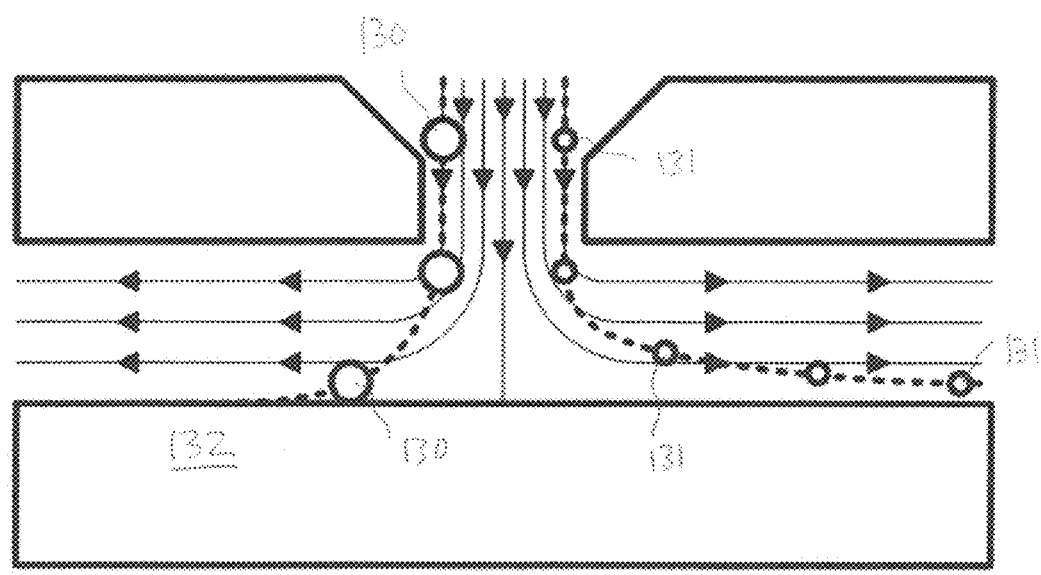
FIG. 12 is a diagram illustrating inertial impaction.

Therefore, with sufficient residence time for a given settling distance, large droplets will be preferentially removed from the aerosol. This may be accomplished by either a long tube or by parallel plates. Referring to FIG. 12, inertial driven capture operates on the principle that larger droplets 130 will have a higher tendency to cross flow streamlines (increased ratio of inertia to drag forces) compared to smaller droplets 131. This phenomenon is used advantageously to separate larger droplets 130 from, smaller ones 131 either by capture on a surface as is the case with traditional impactors or into a secondary flow as is the case with virtual impactors. Large droplets 130 carry more momentum causing them to cross more streamlines, thus causing them to impact on an opposing surface 132. Smaller droplets 131 are able to change direction more rapidly and are therefore able to escape the impaction region. For round jet impactors, the particle diameter at which 50% of the particles are removed from the aerosol ($d_{50}$) can be calculated using $$d_{50} = \sqrt{\frac{9\mu\pi D^3 (Stk_{50,Round})}{4\rho Q}},$$

where $\mu$ is the gas viscosity, D is the jet diameter, $\rho$ is the panicle density, and Q is the volumetric gas flow rate (Marple et al. Atmospheric Environment Vol. 10. pp. 891-896) for round jet impactors, $Stk_{50}$ is around 0.24. Droplets that are on streamlines near the boundary layer achieve a lower velocity and therefore have less momentum which causes a bias towards large droplets escaping the impactor, Large droplet removal efficiency can be improved by adding a annular sheathing flow to the aerosol which confines the aerosol 'jet' in the centerline of the flow ensuring that all of the droplets, are at a sufficient velocity to be removed.

Figure 13:
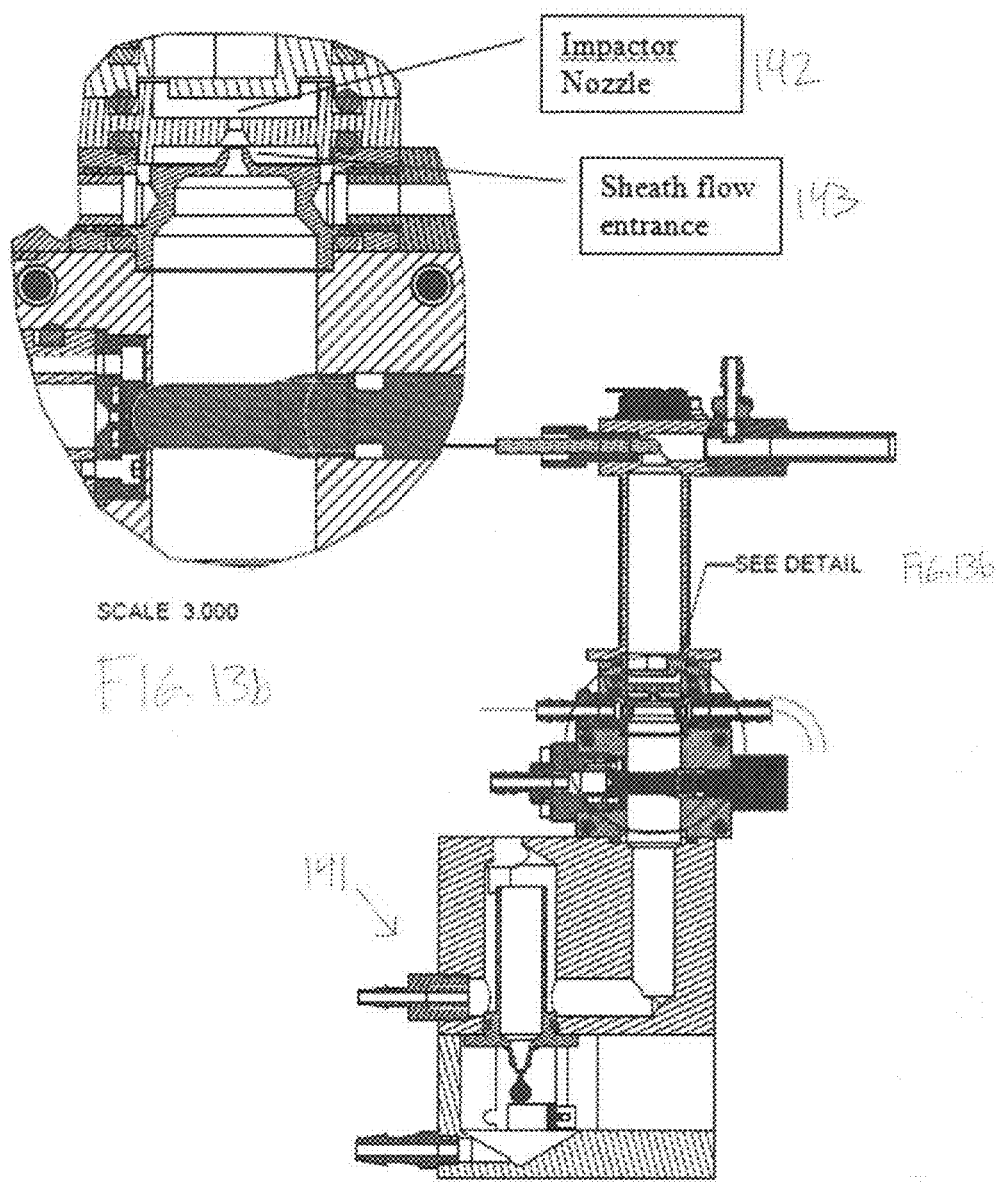
FIGS. 13a and 13b show an embodiment of a jet impactor nebulizer with large droplet removal functionality.
Figure 14:
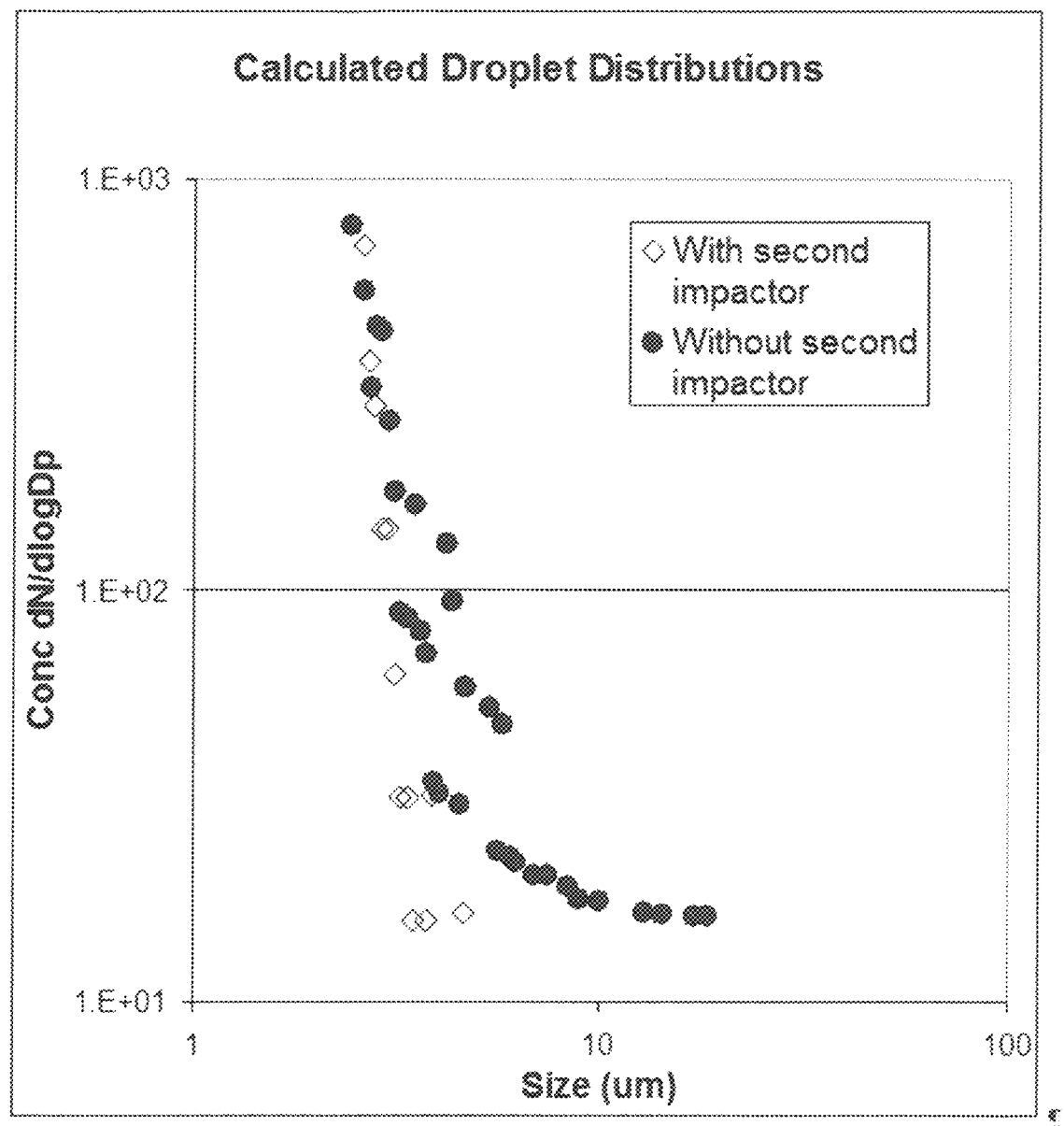
FIG. 14 is graph showing the expected reduced maximum nonvolatile, residues

FIGS. 13 a-b show an embodiment of a nebulizer 140 including a large droplet removal means. The assembly includes a jet impactor 141, sheath flow entrance 142 and an impactor nozzle 143. The impacting surface is heated to remove, by evaporation, the liquid introduced by impacted droplets. Data showing enhanced large droplet removal by the jet impactor is shown in FIG. 14, a graph of calculated droplet distributions.

A basic embodiment of the method of the present invention comprises the step of creating fine droplets of the fluid (nebulization) containing particles and dissolved material at concentrations equal to the bulk material. Upon evaporation of the liquid, the gas-home droplet becomes either a particle consisting of non-volatile dissolved material or a particle consisting of a colloid particle and non-volatile dissolved material. The particles are then sampled by a condensation particle counter (CPC) with a temporally or spatially varying detection threshold diameter. In the preferred embodiment, the sample introduced to the nebulizer may consist of the unaltered source colloid, a colloid downstream of a sample introduction device, or downstream of a colloid concentrator (employing evaporation and/or cross flow filtration). In one embodiment, the degree of supersaturation is temporally varied by adjusting the temperatures of the saturated aerosol stream and/or the walls of the transport cavities on the condensing region. These temperatures may either be adjusted in a stepwise manner or continuously ramped. In another embodiment, the degree of supersaturation is temporally varied by adjusting the ratio of a vapor saturated flow to a dry flow, in another embodiment, the degree of supersaturation is temporally varied by adjusting the vapor content, by controlling the mass of vapor delivered to the gas either by adding a controlled amount of liquid to the gas stream or by controlling the exposure of the gas stream to the working fluid surface. And in yet another embodiment, the degree of supersaturation is spatially varied where particles are exposed to an increasing degree of supersaturation. Larger particles (where the onset of condensational growth occurs at a lower supersaturation) have a longer growth period and thus the resulting droplets are larger. By measuring the amount of light scattered by these droplets (larger droplets lead to more scattered light), the size of the original particle can be inferred.

Other embodiments of the method of the invention include, but are not limited to, the following Examples. A base process is for determining the size distribution of particles in a colloid by measuring the size distribution of aerosolized particles using an aerosol particle detector with a variable detection threshold. Particular methods and criteria for aerosolizing the colloid are described in incorporated by reference U.S. Pat. No. 8,272,253. One version of the process involves using a thermally diffusive laminar flow type condensation particle detector.

A. In one route, the detection limit is varied by adjusting the condenser temperature downstream of an aerosol flow saturated with the working vapor, and:
  i. the temperature is adjusted in a stepwise manner and the concentration measurement is made after reaching steady state; or
  ii. alternatively, the temperature is adjusted and measured throughput the transition period where the detection limit is inferred from the measured temperatures;

B. In another route, the detection limit is varied by adjusting the temperature of the vapor saturated aerosol and:
  i. the temperature is adjusted in a stepwise manner and the measurement is made after reaching steady state, or
  ii. alternatively, the temperature is adjusted and measured throughput the transition period where the detection limit is inferred from the measured temperatures, C. In a further route, the detection limit is varied by adjusting the temperature of the vapor saturated aerosol and the temperature of the walls in the condenser region, and:
  i. the temperature difference between the saturator and condenser is adjusted in a stepwise manner and the measurement is made after reaching steady state, or
  ii. alternatively, the temperature difference between the saturator and condenser is adjusted and measured throughput the transition period where the detection limit is inferred from the measured temperatures.

D. In yet another route, the detection limit is adjusted by varying the condensing vapor content prior to the condenser, and
  a. the aerosol is split between a dry passage and a saturating passage using, for example, a proportional three way valve, or
  b. alternatively, the aerosol is coaxially sheathed by clean air where the vapor content in the sheath air is adjusted to a controlled vapor pressure by varying the ratio of dry and saturated gas streams supplying the sheath flow (note the dry stream may be omitted):
    i. the aerosol flow does not contain vapor,
    ii. alternatively, the aerosol flow is saturated with vapor, or
    iii. alternatively the ratio of the aerosol to sheath flow is varied to control the vapor pressure of the resulting mixture.

Another version of the process involves using a mixing type condensation particle detector.
  a. where the aerosol may be present in either or both of the mixing gas streams, and
  b. the detection threshold is varied by adjusting the temperature difference between the hot and cold mixing flows:
    i. where the temperature is adjusted in a stepwise manner and the concentration measurement is made after reaching steady state, or
    ii. where the temperature is adjusted and measured throughput the transition period where the detection limit is inferred from the measured temperatures.

Also using mixing type condensation particle detector:
  a. the aerosol may be present in either or both of the mixing gas streams, and
  b. the detection threshold is varied by adjusting the working vapor content in the hot and/or cold flows:
    i. the vapor pressure is controlled by a metered liquid introduction such as a syringe or peristaltic pump driven nebulizer,
    ii. alternatively, the vapor pressure is controlled by limiting the exposure of the gas stream to the surface of the saturating liquid either spatially or temporally, or
    iii. as a further alternative, the vapor pressure is controlled by varying the ratio of dry and saturated gas streams in either the hot or cold flows.

Again using the mixing type condensation particle detector:
  a. where the aerosol may be present hi either or both of the mixing gas streams, and
  b. where the detection threshold is varied by adjusting the flow ratio of hot and cold gas streams:
    i. where vapor is present in both gas streams, or
    ii. where vapor is present only in the hot gas stream.

Returning to the thermally diffusive laminar flow type condensation particle detector, in another embodiment of method, the temperature of the condenser region may be spatially varied resulting in smaller particles experiencing less time for growth where the initial particle size may be inferred from the size of the resulting droplets.

In a further aspect of the method, where with either a laminar flow or mixing type a condensation particle counter, the process involves controlling the vapor pressure of one or more condensing fluids by explicitly controlling the mass of vapor present in the aerosol prior to the condensing region:
  a. the controlled vapor is the only condensing vapor:
    i. the vapor pressure is controlled by a metered liquid introduction such as a syringe or peristaltic pump driven nebulizer, or
    ii. alternatively, the vapor pressure is controlled by limiting the exposure of the gas stream to the surface of the saturating liquid either spatially or temporally; or
  b. alternatively, where two vapors are present:
    i. one vapor is saturated hut alone is not suitable for sufficient particle growth (e.g. diethylene glycol) and the controlled vapor is present to continue growth to a sufficient size (e.g. butanol), wherein the growth vapor would otherwise undergo homogeneous nucleation at the temperatures required for nucleation using the saturated vapor, or
    ii. alternatively, the secondary vapor concentration is controlled by varying the ratio of gas saturated with the primary vapor and gas saturated with the primary and secondary vapors.

The above methods may be practiced by calculating the differential concentration measured by the CPC at each of the operating condition. The colloidal particle size distribution may be inferred directly by the condensed droplet size distribution. The process may be used to measure the particle size distribution of an unaltered colloid, a diluted colloid, or a colloid passing through a colloid concentrator. Colloid concentration may be accomplished operates using cross flow filtration or by evaporation. Examples of evaporative methods include a semi porous membrane e.g. Porous PTFE (Zeus Corp) bathed in hot, dry gas, or by exposing the liquid surface to hot, dry gas. A preferred condensing vapor is a Fluorinated Solvent (Fluorinert or Novec). In this case, the condensing vapor is preferably recovered by condensation. The condensed working fluid is not miscible with the colloid solvent. And, the recovered working fluid is recycled by drawing it from the appropriate strata within the recovered liquids.

Regarding the method of using a movable impactor pin where an axial force is applied to the pun the force may be constant (e.g. provided by a regulated gas source), the force may vary with pin position (e.g. provided by a spring), or the force may be adjustable (e.g. by adjusting the preload of a spring, or adjustment by changing gas pressure).

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material or acts described in the specification and equivalents thereof, including both structural equivalents and equivalent structures, material-based equivalents and equivalent materials, and act-based equivalents and equivalent acts.

The invention claimed is:

1. A system for determining the size distribution of particles in a fluid, comprising a droplet former for forming a stream of aerosol droplets of the fluid, the droplets containing particles and dissolved material, and a thermally diffusive laminar flow type condensation particle detector for evaporating the droplets to generate particles and for measuring the concentration of particles, the condensation particle detector having a variable detection threshold, the condensation particle detector having:

a gas flow stream saturated with droplets, an upstream saturation region, and a downstream condensing region, the condensation particle detector:

saturating the droplets, varying the degree of saturation, and condensing the droplets.

2. The system of claim 1 wherein the fluid is a colloid.

3. The system of claim 2, further comprising a sample introduction input communicatively connected to the droplet former, and wherein the colloid is an unaltered colloid or a diluted colloid.

4. The system of claim 3, further comprising a fluid concentrator disposed between the sample introduction input and the droplet former.

5. The system of claim 4, wherein the fluid concentrator is an evaporator or a cross flow filter.

6. The system of claim 1, wherein the droplet former is a nebulizer.

7. The system of claim 6, wherein the nebulizer has an impactor pin.

8. The system of claim 7, wherein the impactor is movable and spring loaded.

9. The system of claim 8, wherein the impactor pin provides a pin force that varies with pin position.

10. The system of claim 9 wherein the force is spring regulated.

11. The system of claim 7, wherein the impactor pin provides a constant pin force.

12. The system of claim 11, wherein the force is gas regulated.

13. The system of claim 7, wherein the impactor pin force is adjustable.

14. The system of claim 13, wherein the pin force is spring regulated.

15. The system of claim 13, wherein the pin force is gas regulated.

16. The system of claim 1 wherein the detection threshold is temporally variable via temperature.

17. The system of claim 1, wherein the detection threshold is temporally variable via the ratio of a flow of vapor saturated with droplets with a separate flow of a dry gas.

18. The system of claim 1, wherein the detection threshold is temporally variable via the mass of vapor delivered to a flow of gas.

19. The system of claim 1, wherein the detection threshold is spatially variable.

20. The system of claim 1 wherein particle size is inferred from the size of the resulting droplets, particle size being directly proportional to droplet size.

21. The system of claim 1, wherein a Fluorinated solvent condensing vapor is input to the system.

22. The system of claim 21, wherein the condensing vapor is recovered by condensation, a condensed working fluid is not miscible with the colloid solvent, and the recovered condensed working fluid is recycled by drawing it from a strata within the recovered liquids condensed working fluid.

23. The system of claim 1 further comprising a large droplet removal mechanism.

24. The system of claim 23, wherein the large droplet removal mechanism is disposed in tandem with a primary impact pin of the droplet former.

25. The system of claim 23, wherein the large droplet former includes a gravitational settling mechanism.

26. The system of claim 23, wherein the large droplet former comprises an inertial impactor.

27. The system of claim 26, wherein the inertial impactor has a heated impaction surface.

28. The system of claim 26, further including a coaxial clean sheath air flow.

* * * * *